United States Patent [19]

Grillo

[11] Patent Number: 4,930,553

[45] Date of Patent: Jun. 5, 1990

[54] PRESSURE RELIEF VALVE

[75] Inventor: John L. Grillo, East Haddam, Conn.

[73] Assignee: The Lee Company, Westbrook, Conn.

[21] Appl. No.: 299,305

[22] Filed: Jan. 23, 1989

[51] Int. Cl.$^5$ ............................................. F16K 15/04
[52] U.S. Cl. ................................. 137/508; 137/539.5
[58] Field of Search ............... 137/508, 539.5, 542, 137/543.13, 540; 251/900

[56] References Cited

U.S. PATENT DOCUMENTS

| | | | |
|---|---|---|---|
| 2,481,713 | 9/1949 | Bertea | 137/539.5 X |
| 2,731,981 | 1/1956 | Glasser | 137/542 X |
| 2,889,134 | 6/1959 | Bryant | 251/900 X |
| 2,931,673 | 4/1960 | Gondek | 251/900 X |
| 2,987,071 | 6/1961 | Haus | 137/539.5 X |
| 3,007,481 | 11/1961 | Frost | 137/508 X |
| 3,036,593 | 5/1962 | Saville | 137/508 X |
| 4,074,695 | 2/1978 | Weirich et al. | 137/508 |
| 4,274,435 | 6/1981 | Block | 137/508 |
| 4,313,463 | 2/1982 | Weirich | 251/900 X |
| 4,718,442 | 1/1988 | Nicoll | 137/540 X |

Primary Examiner—Stephen M. Hepperle
Attorney, Agent, or Firm—Philip L. Lee

[57] ABSTRACT

A pressure relief valve comprises a poppet member that is biased toward and sealingly engages a slidable tubular valve seat having unrestrained axial rotation and a central relief flow passage. When the system pressure reaches a threshold pressure the valve seat and poppet are both axially displaced such that at the moment that the poppet is unseated from the valve seat, the valve seat is in motion. The motion of the valve seat when the poppet is unseating or reseating allows the valve seat to comply with any eccentricities of the poppet to achieve uniform seat stresses and low leakage rates as well as acceptable flow rates and low hysteresis.

19 Claims, 5 Drawing Sheets

PRESSURE RELIEF VALVE

BACKGROUND OF THE INVENTION

A. Field of Invention

The present invention relates generally to pressure relief valves and more particularly to valves used to control pressure in hydraulic or pneumatic systems.

B. Description of Related Art

Pressure relief valves are available which employ a ball or a poppet biased against a valve seat in communication with a fluid medium. When the pressure exerted by the fluid medium on the ball or poppet exceeds the force exerted by the biasing means, the ball or poppet is disengaged from its seal with the valve seat which allows flow through the valve, thereby relieving and reducing the pressure within the system. When the pressure of the fluid medium in the system is reduced to less than the force exerted by the biasing means, the ball or poppet returns to a sealing engagement with the valve seat. In the conventional pressure relief valves of this type compromises must be made in at least one of the following variables: size, flow, leakage and the valve response characteristics or hysteresis. Commonly, in miniature valves for use in high pressure applications, acceptable rates of flow through the valve are achieved at the cost of unacceptable leakage rates and relatively high hysteresis. The typical ball or poppet and the valve seat with which it engages must be nearly one hundred percent concentric to attain proper sealing characterized by highly uniform seat stresses. Such exact specifications are extremely difficult to achieve, particularly in valves manufactured for miniature applications.

In conventional relief valve designs the valve seat is an integral part of the valve and subject to distortion by installation stresses. It is commonly necessary to subject the valve to axial or radial compression when sealing the orifice or bore into which the valve is typically inserted. Under such external loading the requisite valve seat-poppet concentricity is often lost.

The use of soft materials in the elements of the seal may provide a low leakage rate but generally results in a valve that lacks sufficient integrity for use in high pressure applications. Increasing the area of the interface between the valve seat and the poppet may likewise help to reduce leakage but increase the hysteresis of the valve and thus impair performance.

Since the seat stresses in conventional valves generally decrease in constant proportion to the increase in system pressure, such valves generally experience greater leakage at pressures approaching the desired threshold pressure at which the valve opens.

SUMMARY OF THE INVENTION

The invention herein described is a pressure relief valve wherein the valve seat is generally tubular and is slidingly disposed within the body of the valve which is of a generally cylindrical shape. The valve seat surrounds an axially extending flow passage and is allowed to axially slide within the valve body. An upstream stop and a downstream stop are formed by the inner wall of the valve body and respectively engage the radially outside edges of the upstream and downstream ends of a shoulder formed in the outside surface of the valve seat to limit the axial movement of the valve seat. A poppet member is received within the valve body and is biased by a closure spring against the downstream end of the valve seat to prevent the flow of fluid through the valve. The poppet is axially displaceable from the valve seat to permit fluid flow between the valve seat and the poppet and thereby through the valve. When the system pressure is less than a predetermined threshold, the upstream end of the valve seat shoulder is biased against and restrained by the upstream stop and the poppet sealingly engages the inside edge of the downstream end of the valve seat to prevent flow through the valve. The inside diameter of the downstream end of the valve seat is greater than the inside diameter of the upstream end of the valve seat but is less than the outside diameter of the upstream end of the valve seat. When the system pressure exceeds the predetermined threshold pressure, the force imposed by the system pressure on the upstream end of the valve seat cause the valve seat and poppet to be axially displaced in a downstream direction. The poppet remains in sealing engagement with the downstream end of the valve seat until the valve seat shoulder engages and is restrained by the downstream stop, at which point, the poppet is axially displaced from the valve seat and the valve opens. When the system pressure is sufficiently relieved and reduced by the flow of the fluid medium through the open valve, the force of the closure spring biases the poppet into engagement with the valve seat and in turn biases the valve seat shoulder against the upstream stop and the valve closes.

Variations can be made in the friction caused by the seal between the valve seat and the valve body, in the force of the closure spring, and in the amount by which the outside diameter of the upstream end of the valve seat exceeds the inside diameter of the downstream end of the valve seat. Such variations can alter the operational characteristics of the valve including the threshold pressure and the difference between the pressure at which the valve seat begins to move downstream and the pressure at which the valve opens. In the preferred embodiment the seal friction and the amount by which the outside diameter of the upstream end of the valve seat exceeds the inside diameter of the downstream end of the valve seat are such that the valve seat begins to travel only when the system pressure closely approaches the threshold pressure when the seat stresses are low and leakage can readily occur. During the travel of the valve seat in a downstream direction the seat stresses increase due to the force of the system pressure on the valve seat in the downstream direction and the increase in the force exerted on the poppet in the upstream direction by the increased compression of the closure spring.

Neither the valve seat nor the poppet is prevented from rotation about its axis although friction is imposed by the restraining portions of the valve body when engaged and by the lug that retains the closure spring, and, in the case of the valve seat, by the annular seal. A radial clearance between both the valve seat and the valve body and the poppet and the valve body allows radial compliance by both seating elements sufficient to accommodate eccentricities within manufacturing tolerances. When the valve is in the process of opening or closing, the valve seat is disengaged with all restraints except the annular sealing element that surrounds the valve seat and the valve seat is free to comply with eccentricities in either the poppet surface or the inside edge of the downstream end of the valve seat. In applications wherein the system pressure is relatively close to the threshold pressure of the valve, normal operational fluctuations in the system pressure cause the valve to dither thereby eliminating the breakaway friction of the sealing element which aids the compliance of the valve seat to poppet and which in turn results in reduced hysteresis, uniform seat stresses and low leakage.

In one form of the invention, a double seal assembly surrounds the valve seat in the space between the inside of the valve body and the outside of the valve seat. The seal assembly is annular and is suitable for applications where back pressure may be encountered. In the absence of such conditions a single annular seal is used between the valve seat and the valve body.

In a preferred form of the invention, the valve seat shoulder and the stops are annular and are adjacent to the downstream end of the valve seat. The portion of the valve seat upstream of the shoulder comprises a tubular portion that defines the flow passage and is surrounded by an annular seal. The ratio of the length of the valve seat to the inside diameter of the valve seat may be varied to modify the operational characteristics of the valve and in the preferred embodiment is approximately 4. This preferred ratio provides greater stabilization of the flow approaching the valve seat to poppet interface than lower ratios. Making the inside diameter of the valve seat smaller without other changes will decrease the acceleration of flow in response to increased system pressure. The valve body is comprised of two parts one of which forms the upstream stop and the other of which forms the downstream stop. The two parts of the valve body are joined during assembly after insertion of the valve seat and the means of joining the two parts may be such that disassembly is possible without removal of the valve from the bore in which it is installed. The poppet and closure spring are retained within the valve body by a retainer lug which threadably engages the interior of the downstream end of the valve body. The retainer lug has a central opening providing a flow passage and can be removed for inspection of the poppet and can be axially positioned to adjust the force of the closure spring on the poppet.

The principal aim of the present invention is to provide a new and improved pressure relief valve in which compliance between the seating elements is possible during operation whereby hysteresis is reduced and valve seat leakage is minimized.

Other objects and advantages of the invention will become apparent from the Description of the Preferred Embodiments and the Drawings.

DESCRIPTION OF THE PREFERRED EMBODIMENTS

Figure 1:
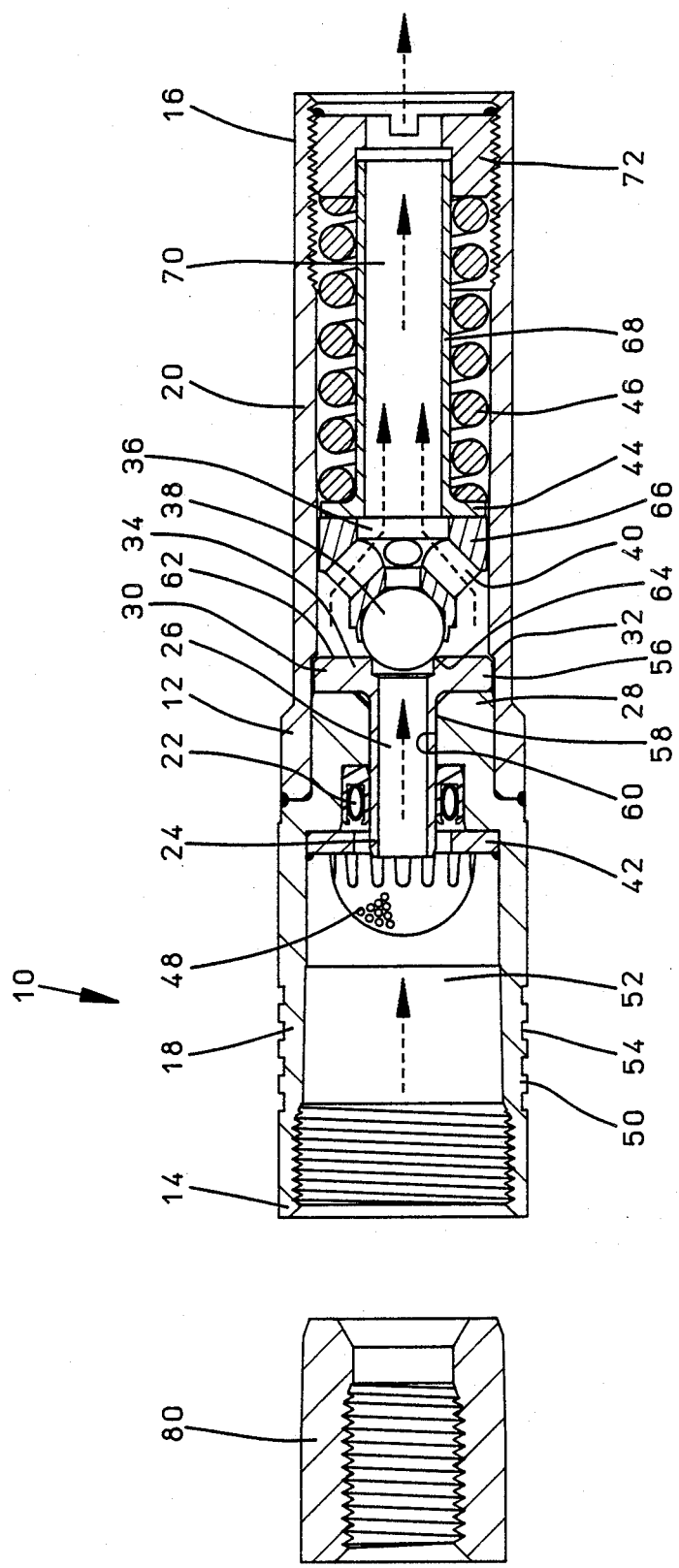
FIG. 1 is an axial sectional view of a pressure relief valve in accordance with the present invention, said valve being illustrated in a closed position.

With reference to the drawings wherein like numerals represent like parts throughout the figures, a Pressure Relief Valve in accordance with the present invention is generally designated in FIG. 1 by the numeral 10. Pressure Relief Valve 10 is specially adapted to regulate pressure in a fluid system by opening and closing at a pre-established threshold pressure to thereby release excess pressure to a relief outlet. Pressure Relief Valve 10 is preferably of a compact miniaturized form which is mounted in position in a fluid conduit (not illustrated) of a hydraulic or pneumatic system. Pressure Relief Valve 10 is inserted into an installation bore (not illustrated) and secured in a fixed position therein. The direction of the flow of through the fluid passageway formed by the Pressure Relief Valve 10 is generally designated by the arrow in FIG. 1. The Broken arrow of FIG. 1 illustrates the directional flow path subsequent to the opening of the pressure relief valve 10.

The Pressure Relief Valve 10 comprises a main valve body 12 in the form of an axially extending sleeve having an upstream end 14 and a downstream end 16. The valve body 12 interiorly receives the valve assembly and partially defines the relief path through the valve. In the preferred embodiments, the valve body 12 is assembled of an upstream section 18 and a downstream section 20 both of which are generally cylindrically shaped and are joined or welded together during assembly. In the embodiment illustrated in FIG. 1, the upstream valve body section 18 forms an exterior mounting surface 50 and a tapered inlet bore 52. The mounting surface 50 forcefully engages the wall of an installation bore to securely mount the Pressure Relief Valve 10 in position in the fluid system. A plurality of circumferentially extending axially spaced grooves 54 traverse the exterior mounting surface 50 to form alternating axially spaced sealing lands and grooves. The Pressure Relief Valve 10 is preferably mounted in a fluid conduit by inserting the valve body into an installation bore. A tapered pin 80 is inserted into the tapered inlet bore 52. The pin 80 and the tapered inlet bore 52 are dimensioned so that as the tapered pin 80 is forcefully, axially driven into the tapered inlet bore 52 (to the right in FIG. 1) toward the downstream end 16, the pin 80 forces the upstream valve body section 18 to controllably radially expand to thereby force the said lands to sealingly engage the surrounding wall of the installation bore of the fluid conduit. The edges of the lands bite into the surrounding material of the installation bore to form independent seals and retaining rings with the installation bore. A passage through the tapered pin subsequently functions as an inlet fluid passageway when the Pressure Relief Valve 10 is mounted in position. The tapered pin 80 and the inlet bore 52 are partially interiorly threaded to provide for the insertion and fastening of a threaded removal tool (not shown).

Figure 3:
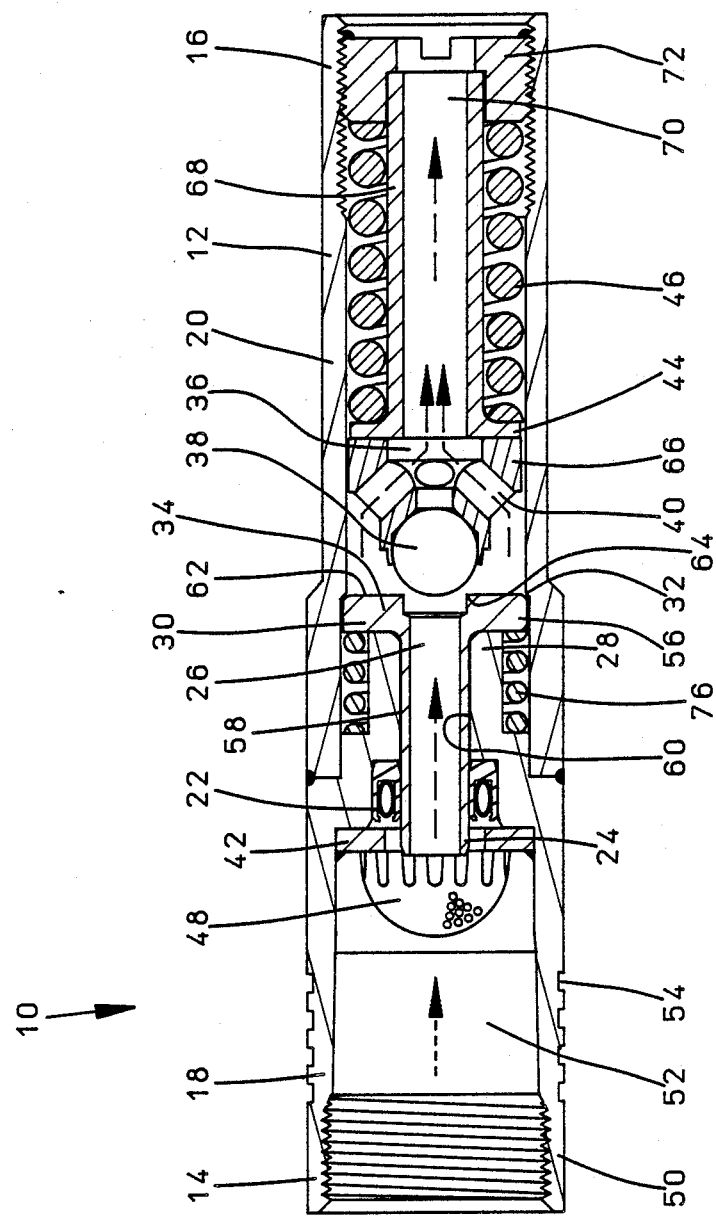
FIG. 3 is an axial sectional view of a third embodiment of a pressure relief valve with valve seat biasing spring in accordance with the present invention, said valve being illustrated in a open position.
Figure 3:
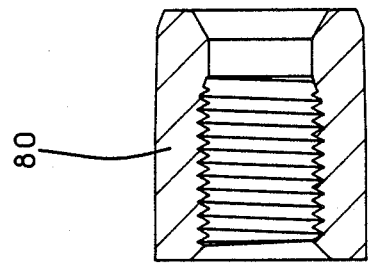

The valve assembly of the Pressure Relief Valve 10 generally comprises a movable valve seat 30, a poppet 36 and a closure spring 46, all generally received interiorly of the valve body 12. The closure spring 46 functions to bias the poppet 36 into sealing engagement against the valve seat 30 as illustrated in FIG. 1. The valve seat 30 is axially slidingly received by, and is axially rotatable within, the valve body 12. The valve seat 30 is generally cylindrical in shape comprising an upstream end 24 which extends to the inlet bore 52 and is exposed to the system pressure and a downstream end 34. An annular shoulder 56 is integrally formed by and radially protrudes from the downstream end 34 of the valve seat 30 to alternately engage an annular upstream stop 28 formed by the inner wall of the upstream section 18 of the valve body 12 and an annular downstream stop 32 formed by the inner wall of the downstream section 20 of the valve body 12 to limit the axial movement of the valve seat 30. When the valve 10 is closed as illustrated in FIG. 1 the valve seat shoulder 56 is biased against the upstream stop 28 by forcible engagement of the valve seat 30 by the poppet 36 and when the valve 10 is open as illustrated in FIG. 3, the valve seat shoulder 56 is biased against the downstream stop 32 by the system pressure differential across the valve seat 30. The valve seat 30 defines a central axially extending bore 26 providing a central axial flow passage. The valve seat bore 26 is of generally uniform inside diameter except that the bore is enlarged at the downstream end 34 such that the inside diameter of the valve seat bore 26 at the downstream end 34 is greater than the inside diameter of the valve seat bore 26 at the upstream end 24 but is less than the outside diameter of the valve seat at the upstream end 24. The ratio of the length of the valve seat 30 to the inside diameter of the valve seat bore 26 is approximately in the preferred embodiment. The outside surface of the valve seat 30 comprises a valve seat guide surface 58 which is slidably received by a valve seat guide bore 60 defined by the interior surface of the upstream stop 28 that integrally protrudes from the upstream section 18 of the valve body 12. An annular sealing element 22 is sealingly, slidably retained between the interior surface of the upstream section 18 of the valve body 12 and the valve seat guide surface 58. In the preferred embodiments herein described, the sealing element 22 is formed of a graphite fiber filled polytetrafluoroethylene substance; however a wide range of materials could be used, avoiding substances that would tend to bind to the valve seat 30 which likewise may be formed of a variety of substances suitable for the pressure range of the desired application. The sealing element 22 is axially restrained by the upstream side (to the left in FIG. 1) of the upstream stop 28 and by an annular retainer 42 having a central opening for receiving the upstream end of the valve seat 30. The downstream end 34 of the valve seat 30 generally presents a transverse disc shaped surface 62 with a central opening for the valve seat bore 26. The annular edge 64 of surface 62 by which the valve seat bore 26 is defined sealingly engages the poppet 36 when the valve 10 is closed. It will be appreciated that the annular sealing interface between the valve seat edge 64 and the poppet 36 is generally coaxial with the central axis of the valve body 12 and the valve seat bore 26 and that the valve seat 30, valve body 12 and the poppet 36 are all axially symmetrical. A radial clearance exists between the valve seat guide surface 58 and the valve seat guide bore 60 sufficient in the preferred embodiments herein described to tolerate an angular misalignment of about 0.5 to 1.5 degrees. A radial clearance between the poppet 36 and the interior of the valve body 12 also exists and with the said valve seat clearance allows compliance adequate to accommodate eccentricities due to manufacturing tolerances and achieve uniform seating stresses.

The poppet 36 is a generally elongated sleeve-like member having a closed upstream end forming a valve head 38. The poppet 36 has an intermediate portion of enlarged diameter the exterior surface of which forms a poppet guide surface 66 and the downstream portion of which forms an intermediate annular transverse shoulder 44. The guide surface 66 is slidably received by the interior of the downstream section 20 of the valve body 12. A sleeve 68 of reduced diameter axially integrally extends from an intermediate location to the open downstream end of the poppet 36. An axial relief bore 70 through the poppet sleeve 68 connects with four angularly spaced radial openings 40 proximate to the valve head 38 and which communicate through the open downstream end of the poppet 36. The valve head 38 presents a surface to sealingly and displaceably engage the downstream end 34 of the valve seat 30. In the preferred embodiment illustrated in FIG. 1 the valve head 38 comprises a partially enclosed ball bearing type metallic sphere retained by the upstream end of the poppet such that an exposed portion of the spherical surface provides a convex surface that sealingly engages the valve seat edge 64. Alternative configurations of the valve head 38 surface are possible, including conical forms. A helical closure spring 46 surrounds poppet sleeve 68 and functions to bias the poppet 36 into the sealing engagement with the valve seat 30. The transverse shoulder 44 axially engages the upstream end of the closure spring 46. The downstream end of the closure spring 46 is seated by the upstream surface of an axially positionable retainer lug 72 threadably received at the downstream end 16 of the valve body 12. The retainer lug 72 forms a cylindrical recess which slidably receives the downstream end of the poppet sleeve 68 to provide a centering and guide structure for the poppet 36. The retainer lug 72 also has a central axial opening which forms a central axial passage aligning with the relief bore 70 so that the relief path is provided through the valve 10 in the general direction of the broken arrows traversing the inlet bore 52, the valve seat bore 26, relief orifices 40, and the relief bore 70 for communication through the downstream end 16 of the valve body 12.

When the force produced by the system pressure communicated to inlet bore 52 and exerted against the valve seat 30 and poppet 36 exceeds the spring force of the closure spring 46 and the frictional force of the sealing element 22, then the valve seat 30 and poppet 36 travel, while still in sealing engagement, in an axially downstream (to the right in FIG. 1) direction until the valve seat shoulder 56 engages and is restrained by the downstream stop 32. Upon the engagement and the restraint of the valve seat shoulder 56 against the stop 32, continued pressure from the fluid media of the system exerted against the surface of the valve head 38 in excess of the spring force of the closure spring 46, the poppet 36 is axially displaced (to the right in FIG. 1) from the sealing engagement between the valve head 38 and the valve seat 30, thereby opening the valve 10.

It will be appreciated that the axial displacement of the valve seat 30 depends upon whether the force of the system pressure exerted upon the area equal to the amount by which the area of a circle with a diameter equal to the outside diameter of the upstream end 24 of the valve seat 30 exceeds the area of a circle with a diameter equal to the inside diameter of the downstream end 34 of the valve seat 30 is greater than the frictional force imposed by the sealing element 22. When the frictional force of the seal element 22 remain constant, the operational characteristics of the valve 10 may accordingly be altered by variations in the ratio of the outside diameter of the upstream end 24 of the valve seat 30 to the inside diameter of the downstream end 34 of the valve seat 30. Alterations in said ratio directly affect the ratio of the pressure at which the valve seat begins to travel to the pressure at which the valve 10 opens. In the preferred embodiment, the valve seat 30 is dimensioned such that the valve seat 30 is in axial motion as the threshold pressure is approached at which pressure range the seat stresses are approaching the point at which leakage occurs.

The foregoing pressure relief valve 10 is a relatively compact valve which in one preferred embodiment has an axial length on the order of 1.03 inches and a maximum diameter in the order of 0.281 inches. In said preferred embodiment the inside diameter of the upstream end 24 of the valve seat 30 is about 0.055 inches, the outside diameter of the upstream end 24 of the valve seat 30 is about 0.075 inches, the inside diameter of the downstream end 34 of the valve seat 30 is about 0.070 inches, and the diameter of the poppet guide surface 66 is about 0.187 inches. In said preferred embodiment, the clearance between the interior surface of the valve body 12 and the poppet guide surface 66 of from 0.0045 to 0.0055 inches and the clearance between the valve seat guide surface 58 and the valve seat guide bore 60 is from about 0.0007 inches to about 0.0017 inches. In said preferred embodiment, the valve seat 30 travels an axial distance of about 0.005 to 0.010 inches from when the valve seat shoulder 56 engages the upstream stop 28 to the engagement of the valve seat shoulder 56 against the downstream stop 32. Depending upon the flow through the valve 10, the poppet will be axially displaced from about 0.010 to about 0.015 inches when the valve 10 is open. Said preferred embodiment is designed for operation in systems where the desired cracking pressure is in the range of 2,000 to 4,000 pounds per square inch and for maximum flow rates of 0.5 to 1.5 gallons per minute while achieving a leakage rate of about 2 cubic centimeters per hour.

Figure 2:
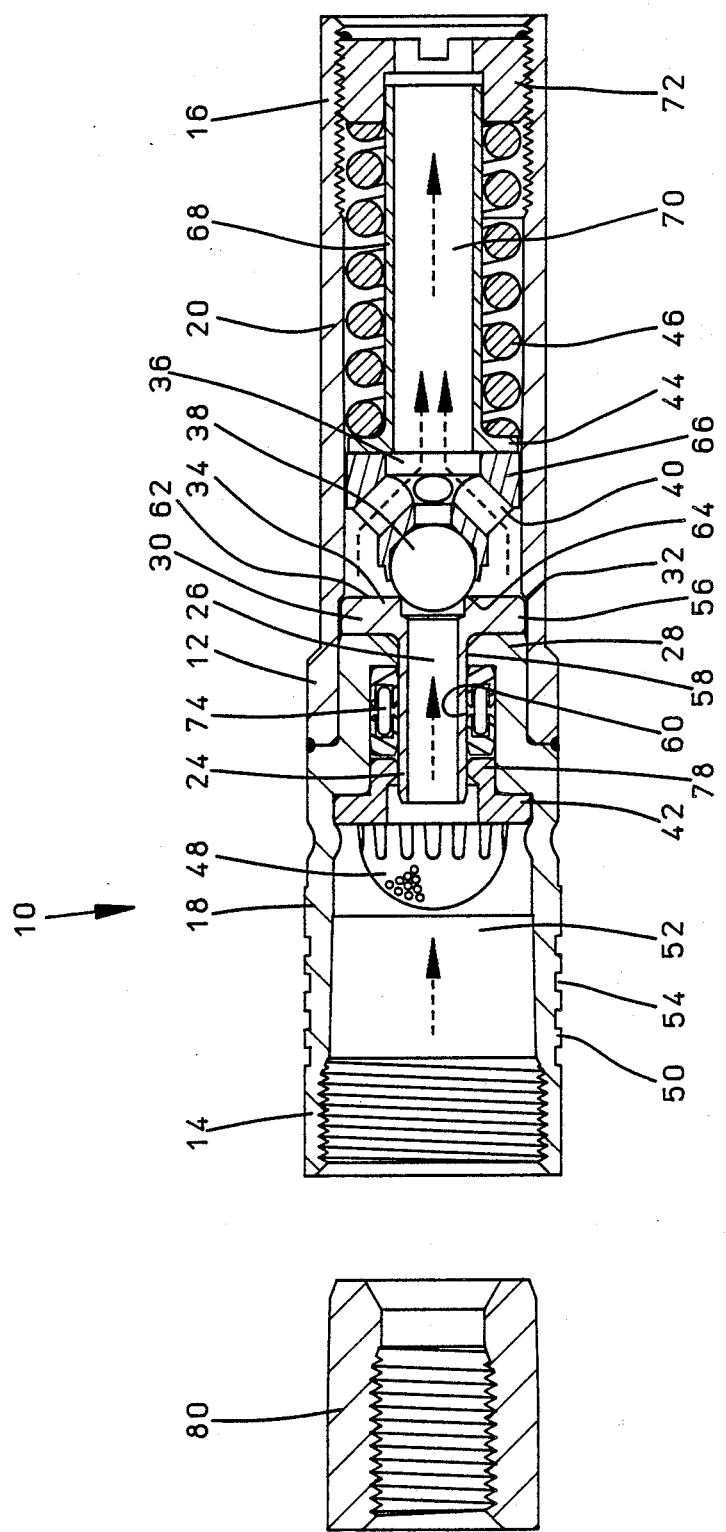
FIG. 2 is an axial sectional view of a second embodiment of a pressure relief valve with enlarged seal in accordance with the present invention, said valve being illustrated in a closed position.

In one form of the invention as illustrated in FIG. 2, an enlarged annular seal 74 surrounds the valve seat 30 in the space between the inside of the valve body 12 and the outside of the valve seat 30 in place of the single sealing element 22. The retainer 42 further comprises an annular flange 78 that extends axially downstream and surrounds and slidingly engages the exterior surface of the valve seat 30 to provide a double seal assembly suitable for applications where back pressure may be encountered.

In another form of the invention as illustrated in FIG. 3, a valve seat biasing helical spring 76 is positioned to bias the valve seat 30 axially downstream toward the downstream stop 32. The downstream end of the spring 76 engages the valve seat shoulder 56 and the upstream end of the spring 76 is seated in a recessed portion of the upstream stop 28. The downstream biasing force of the spring 76 serves to assist in overcoming the friction force of sealing element 22 which resists the movement of the valve seat 30 when the valve 10 begins to open.

Figure 4:
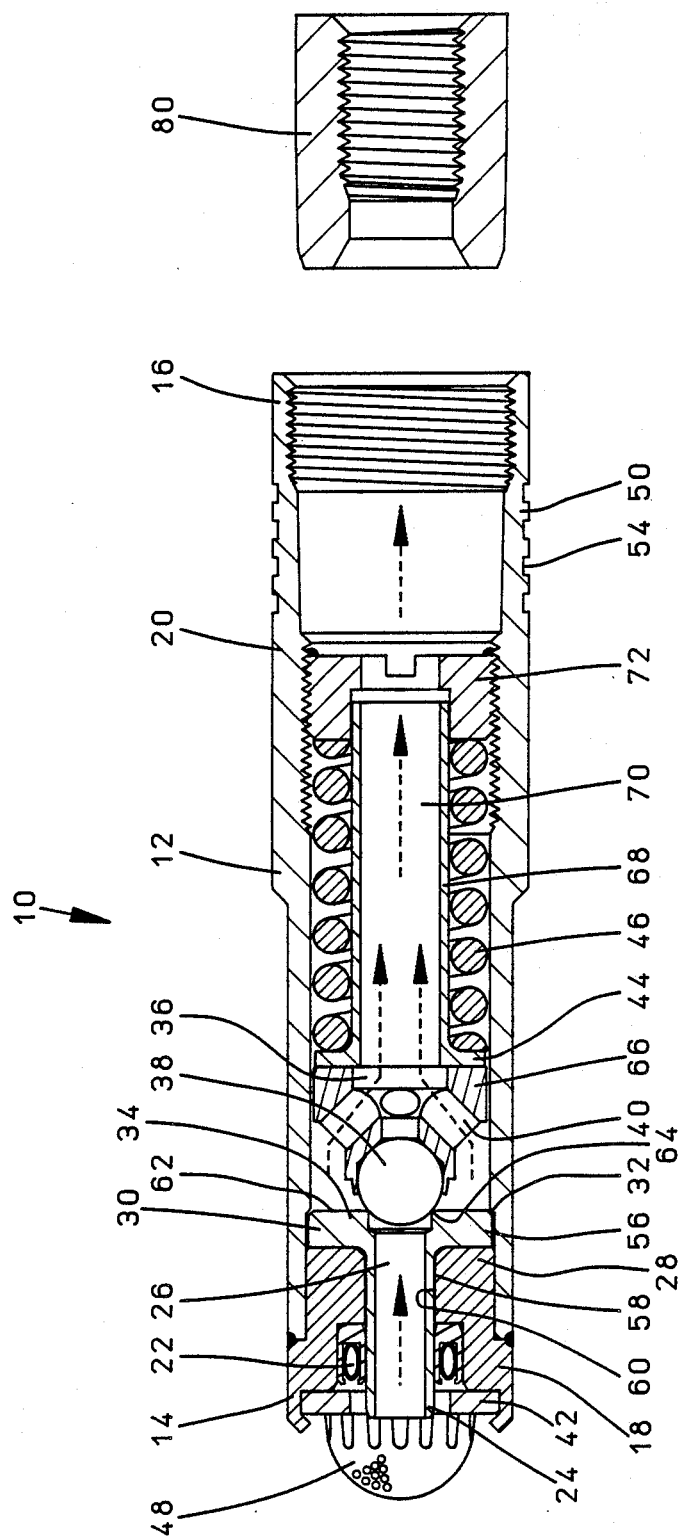
FIG. 4 is an axial sectional view of a fourth embodiment of a pressure relief valve in accordance with the present invention, said valve being illustrated in a closed position.
Figure 5:
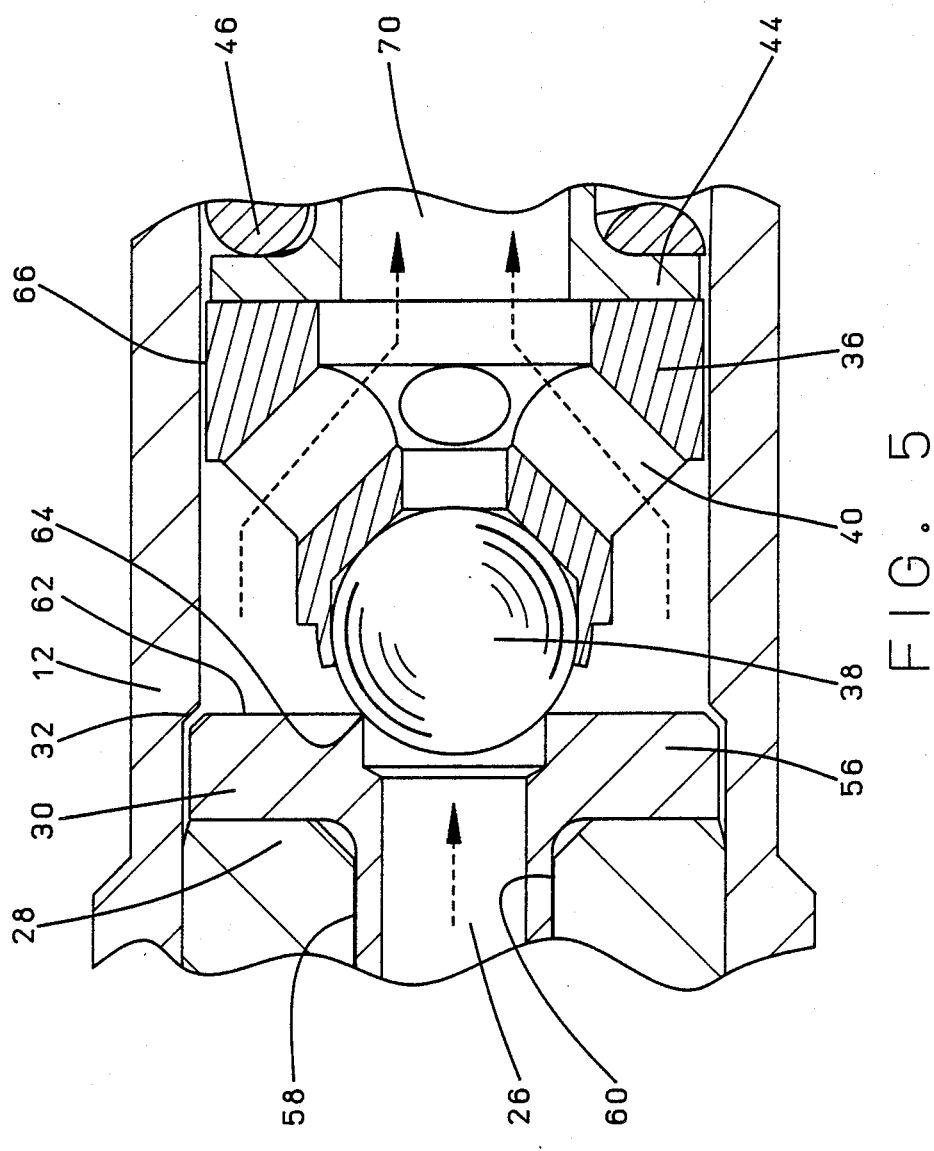
FIG. 5 is an enlarged fragmentary axial sectional view of a portion of the embodiment of a pressure relief valve illustrated in FIG. 1 showing the relative positions of the seat and poppet within the valve body.

It should be further appreciated that the invention may be modified, as illustrated in FIG. 4, by locating the external mounting surface 50, tapered bore 52, and tapered pin 80 assembly at the downstream end 16 of the valve body 12. The configuration illustrated in FIG. 4 is a useful aid to installation and inspection in certain applications.

An additional modification and common feature of the valve 10 is the inclusion of a screen assembly 48 traversing the flow passage upstream of the valve seat 30. The screen assembly 48 illustrated in FIG. 1 is similar to the folded filter screen disclosed in U.S. Pat. No. 4,699,715, the contents of which are incorporated herein by this reference; any screen type may be used that is suitable for the desired application.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A pressure relief valve comprising:
   (a) housing means for forming a generally tubular, axially extending body defining an axially extending cavity with opposing valve seat stopping means projecting interiorly from the inside wall of said body;
   (b) valve seat means slidingly and axially rotatably received within said body, said valve seat means forming an axially extending central flow passage and having an upstream end and a downstream end, the downstream end forming an annular valve seat edge surrounding said passage and a radially projecting shoulder, said shoulder alternately engaging said valve seat stopping means, the valve seat means being formed such that the radius of the outside perimeter of the upstream end of said valve seat means exceeds the radius of the annular valve seat edge by an amount sufficient that when the valve is closed the force exerted on the valve seat means in a downstream direction by the pressure of the fluid media exceeds the force of friction between the body and the valve seat means;
   (c) poppet means slidingly and axially rotatably received within said body and axially displacable therein, the poppet means having a valve surface sealingly engageable with the valve seat means to prevent the flow of fluid through the valve seat means and axially displaceable from the valve seat means to permit the flow of fluid between the valve surface and the valve seat means and having a generally sleeve-like portion and a plurality of passages to provide fluid communication with the interior of said sleeve-like portion; and
   (d) biasing means for biasing said poppet means against said valve seat means in an upstream direction so that unless and until the force exerted against said poppet in a downstream direction exceeds a predetermined threshold, said valve surface sealingly engages said valve seat means, and when the force exerted against said poppet in a downstream direction exceeds the predetermined threshold, said poppet is axially displaced from the valve seat means in the downstream direction.

2. The pressure relief valve of claim 1 wherein said valve seat means has an upstream facing transverse aspect of sufficient area that the valve seat means is biased in the downstream direction and engages the valve seat stopping means before said poppet means disengages from said valve seat means.

3. The pressure relief valve of claim 1 wherein said valve surface is of a spherical shape with a convex surface for engaging said valve seat means along a generally annular sealing interface.

4. The pressure relief valve of claim 1 further comprising a flexible seal of annular shape surrounding the valve seat and interposed between said valve seat means and said housing.

5. The pressure relief valve of claim 4 wherein the bore of the passage defined by the valve seat means is increased proximate to the valve seat edge such that the radius of the valve seat edge is greater than the radius of the passage defined by the valve seat means distal from the valve seat edge and is less than the radius of the outside perimeter of upstream end of the valve seat means.

6. The pressure relief valve of claim 5 wherein the amount by which the area of the upstream facing transverse aspect of the surface of the valve seat means exposed to pressure exerted by the fluid media exceeds the area of the downstream facing transverse aspect of the surface of the valve seat means exposed to pressure exerted by the fluid media when the valve is closed is sufficient that the force exerted in the downstream direction by the fluid within said passage causes the valve seat means to be axially displaced before the poppet means disengages from the valve seat means.

7. The pressure relief valve of claim 6 wherein the ratio of the axial length of said valve seat means to the diameter of the passage defined by said valve seat means is about 4.

8. The pressure relief valve of claim 7 further comprising a spring means for biasing said valve seat means in a downstream direction.

9. The pressure relief valve of claim 8 wherein said annular seal is enlarged and further comprising means for retaining said annular seal, said retaining means having a central annular flange projecting in a downstream direction to sealingly receive said valve seat means.

10. The pressure relief valve of claim 7 wherein the ratio of the radius of the valve seat edge to the radius of the outside perimeter of the upstream end of the valve seat means is about .09.

11. A pressure relief valve comprising:
A. housing means for forming a generally tubular, axially extending body defining an axially extending cavity with an upstream valve seat stopping means and an opposing downstream valve seat stopping means projecting interiorly from the inside wall of said body;
B. valve seat means slidingly and axially rotatably received within said body with a clearance between the interior of the valve body and the exterior surface of the valve seat means such that the valve seat means is allowed to assume an angular displacement of up to about 0.5 to 1.5 degrees from the axis of the valve, said valve seat means forming an axially extending central flow passage and having an upstream end and a downstream end, the downstream end forming an annular valve seat edge surrounding said passage and a radially projecting shoulder, said shoulder alternately engaging said valve seat stopping means, the valve seat means being formed such that the radius of the outside perimeter of the upstream end of said valve seat means exceeds the radius of the annular valve seat edge by an amount sufficient that when the valve is closed the force exerted on the valve seat means in a downstream direction by the pressure of the fluid media exceeds the force of friction between the body and the valve seat means;
C. poppet means slidingly and axially rotatably received within said body and axially displacable therein, the poppet means having a valve surface sealingly engageable with the valve seat means to prevent the flow of fluid through the valve seat means and axially displaceable from the valve seat means to permit the flow of fluid between the valve surface and the valve seat means and having a generally sleeve-like portion and a plurality of passages to provide fluid communication with the interior of said sleeve-like portion and a clearance between the interior of the valve body and the exterior surface of the poppet means such that the poppet means is allowed to match the angular displacement of the valve seat means; and
D. biasing means for biasing said poppet means against said valve seat means in an upstream direction so that unless and until the force exerted against said poppet in a downstream direction exceeds a predetermined threshold, said valve surface sealingly engages said valve seat means, and when the force exerted against said poppet in a downstream direction exceeds the predetermined threshold, said poppet is axially displaced from the valve seat means in the downstream direction.

12. The pressure relief valve of claim 11 wherein the ratio of the radius of the valve seat edge to the radius of the outside perimeter of the upstream end of the valve seat means is about .09.

13. The pressure relief valve of claim 12 wherein said valve surface is of a spherical shape with a convex surface for engaging said valve seat means along a generally annular sealing interface.

14. The pressure relief valve of claim 13 further comprising a flexible seal of annular shape surrounding the valve seat and interposed between said valve seat means and said housing.

15. The pressure relief valve of claim 14 wherein the valve seat means shoulder further comprises a downstream facing transverse surface that is exposed the fluid media when the valve is open and is of greater area than the upstream facing transverse aspect of the valve seat means.

16. The pressure relief valve of claim 15 wherein the valve seat means stop or so positioned that the valve seat means is allowed to travel an actual distance about 0.005 to 0.010 inches.

17. The pressure relief valve of claim 16 wherein the housing is suitable for insertion within the bore of a hydraulic system and is adapted to forcible retention therein.

18. The pressure relief valve of claim 16 wherein the annular seal is enlarged and further comprising means for retaining the enlarged annular seal, said retaining means having a central annular flange projecting in the downstream direction to sealingly receive said valve seat means.

19. The pressure relief valve of claim 16 further comprising a spring means for biasing the valve seat means in the downstream direction.

* * * * *